United States Patent Office 3,464,988
Patented Sept. 2, 1969

3,464,988
3-HYDRAZINOBENZO[h]CINNOLINES
AND 3 - HYDRAZINOBENZOCYCLO-
HEPTA-[5,6-c]PYRIDAZINES
Henry Michael Holava, Jr., and Richard Anthony Partyka,
Liverpool, N.Y., assignors to Bristol-Myers Company,
New York, N.Y., a corporation of Delaware
No Drawing. Filed Jan. 11, 1968, Ser. No. 697,013
Int. Cl. C07d 51/10, 51/04; A61k 27/00
U.S. Cl. 260—250                                    8 Claims

ABSTRACT OF THE DISCLOSURE 5,6-dihydro-3-hydrazinobenzo[h]cinnolines and 3-hydrazinobenzocyclohepta[5,6-c]pyridazines are a class of compounds useful in the treatment of hypertension in animals, including man. In particular, 5,6-dihydro-3-hydrazinobenzo[h]cinnoline hydrochloride is a most effective hypotensive agent.

BACKGROUND OF THE INVENTION

Field of the invention.—The compounds of the present invention are particularly useful in the control of mild to severe hypertension.

Description of the prior art.—The compounds of the present invention are new and novel. The literature contains references to some hydrazinopyridazines having similar activity, i.e., apresoline, but none have a gross structure chemically related to the compounds of the present invention.

SUMMARY OF THE INVENTION

Compounds having the formula

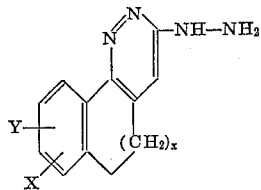

in which Y and X are alike or different and, each is H, F, Cl, Br, $CF_3$ OH, (lower)alkyl, (lower)alkoxy, $NH_2$ and $NO_2$; $n$ is a whole integer of 1 or 2; and nontoxic pharmaceutically acceptable acid addition salts thereof are hypotensive agents.

DETAILED DESCRIPTION

This invention relates to new synthetic compounds of value as hypotensive agents. More particularly the compounds of the invention are 5,6-dihydro-3-hydrazinobenzo[h]cinnolines and 3 - hydrazinobenzocyclohepta-[5,6-c]pyridazines which are useful in the control of hypertension in animals, including man.

Hypertension is a rather common and serious disease, particularly in elderly people. High blood pressure, a result of hypertension, is a common but serious disease. Most particularly, hypertension is often the cause of crippling or fatal strokes in the elderly.

It was therefore an object of the present invention to provide compounds useful in the treatment of mild to severe hypertension.

The objects of the present invention have been achieved by the provision of a member selected from the group of compounds having the frmula

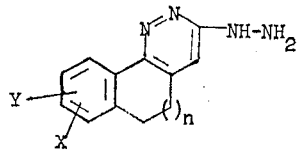

in which X and Y are alike or different and each is selected from the group comprised of H, F, Cl, Br, $CF_3$, OH, (lower)alkyl, (lower)alkoxy, $NH_2$ and $NO_2$; $n$ is a whole integer of 1 or 2; and nontoxic pharmaceutically acceptable acid addition salts thereof.

(Lower)alkyl is defined as including straight and branched chain saturated aliphatic groups having from 1 to 6 carbons inclusive and is preferably methyl and ethyl. The term (lower) shall have the same meaning with respect to (lower)alkoxy.

The nontoxic salts that are pharmaceutically acceptable include the hydrochlorides, hydrobromides, hydroiodides, (lower)alkylsulfates, (lower)alkyl and aryl sulfonates, phosphates, sulfates, maleates, fumarates, succinates, tartrates, citrates, and others commony used in the art.

The salts obtained through the variation of the acid used in some cases have special advantage due to increased stability, increased solubility, decreased solubility, ease of crystallization, lack of objectionable taste, etc., but these are all subsidiary to the main physiological action of the free base, which is independent of the character of the acid used in the preparation of the salt.

The compounds of the present invention are embodied in any of the known pharmaceutical forms for oral, parenteral or rectal administration. The compounds are prepared in solid compositions for oral administration in unit dosage form as tablets, capsules, pills, granules or powders. Solutions, emulsions or suspensions of the compounds are prepared for oral administration also. Sterile suspensions or solutions are prepared for parenteral use. When desirable, the compound is incorporated in suppositories for rectal administration.

The term unit dosage form as used in the specification and claims means a physically distinct entity suitable as a unitary dosage for administration, each unit containing a predetermined quantity of the compound of the present invention. The quantity of the compound contained in the unit dosage form is directly dependent upon the considerations which are well-known in the art of compounding a pharmaceutically active material for therapeutic use. The characteristics of the active compound, the particular therapeutic effect to be achieved, the route of administration and the mechanism of the action of the material in the host are important considerations in determining the quantity of the active compound included in the unit dosage form. Examples of suitable oral unit dosage forms are capsules, pills, tablets, cachets and powder packets for solid compositions, and teaspoonsful, droppersful, ampoules and vials for liquid oral dosage forms.

The tablets or pills can be laminated or otherwise compounded to provide for time-release action of the active compound. For example, the tablet or pill can comprise an inner portion constituting one unit dose and an outer portion constituting another unit dose, the outer portion being in the form of an envelope encompassing the inner portion. The two portions can be separated by an enteric layer which serves to delay the release of the active compound contained in the inner portion by resisting disintegration in the stomach thereby allowing it to pass intact into the intestine where the enteric layer is destroyed releasing the active compound in the inner portion. Such an enteric layer may consist of any number of known substances such as polymeric derivatives or mixtures thereof, cellulose acetate, cetyl alcohol, shellac, cellulose acetate phthalate and the ike.

Examples of oral liquid dosage forms include aqueous solutions, hydroalcoholic solutions, and aqueous or oil suspensions and emulsions wherein the product is dissolved or dispersed in a pharmaceutically acceptable carrier or vehicle. Flavoring agents may be added to increase the palatability of the dosage form. Examples of vehicles are cottonseed oil, sesame oil, peanut oil and the like and acceptable dispersing agents for aqueous suspensions include synthetic and natural gums such as tragacanth, acacia, dextran, methyl cellulose and the like.

Suppositories containing the compounds of the instant invention can be readily prepared in a unit dosage form by mixing the active ingredient with a commonly used suppository base such as theobroma oil, glycerinated gelatin or a polyethylene glycol, and then shaping the mass into a form suited for introduction into the rectum.

The compounds of the present invention are prepared according to the following sequence:

(Step 1)

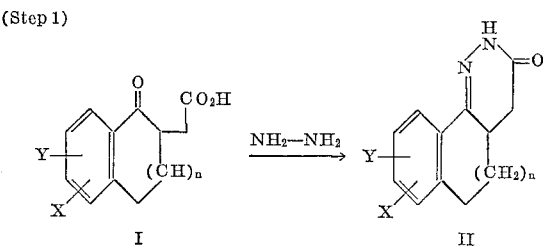

(Step 2)

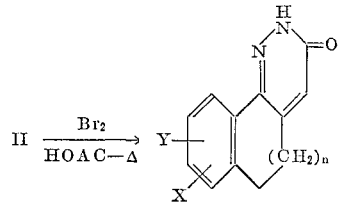

(Step 3)

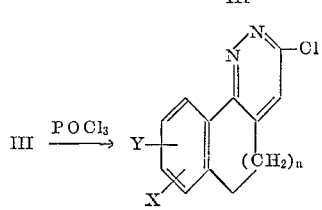

(Step 4)

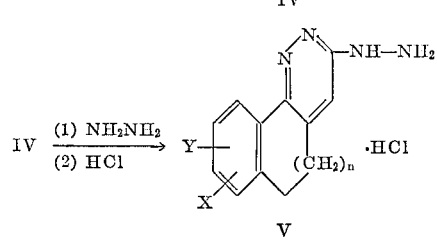

in which X and Y are alike or different and each is selected from the group comprised of H, F, Cl, Br, $CF_3$, OH, (lower)alkyl, (lower)alkoxy, $NO_2$ and $NH_2$, and $n$ is a whole integer of 1 or 2.

The objectives of the present invention have been achieved, by the provision according to the present invention, of the process for the synthesis of compounds having the formula

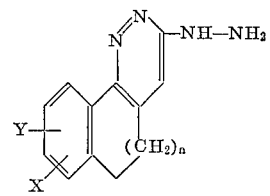

wherein X and Y are alike or different and each is selected from the group comprised of H, F, Cl, Br, $CF_3$, OH, (lower)alkyl, (lower)alkoxy, $NO_2$ and $NH_2$, and $n$ is an integer of 1 or 2; which process comprises the consecutive steps of (a) Treating a compound having the formula

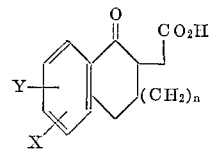

in which X, Y and $n$ are as defined above, with hydrazine (hydrate), preferably a 20 to 60% excess, in an alcoholic solvent such as methanol, ethanol, propanol or the like, with the aid of heat, preferably at reflux temperatures, to produce a compound having the formula

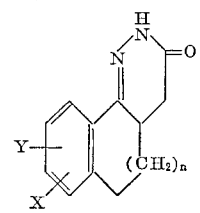

in which X, Y and $n$ are as defined above; and (b) Treating compound II with 1.0–1.5 moles of bromine, but preferably 1 mole of bromine, in a low molecular weight organic acid, preferably acetic acid, with the aid of heat, preferably at about 60°–80° C., to produce a compound having the formula

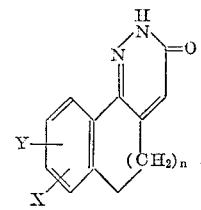

in which X, Y and $n$ are as defined above; and (c) Treating compound III with an excess of phosphorous oxychloride, enough to make a solution when warmed to 100° C., to produce a compound having the formula

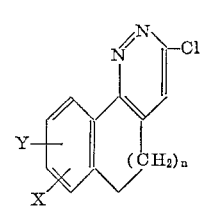

in which X, Y and $n$ are as defined above; and (d) Heating compound IV with an excess of hydrazine hydrate at temperatures up to 130° C. to produce a compound having the formula

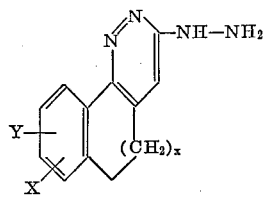

in which X, Y and $n$ are as defined above.

A preferred embodiment of the present invention is a compound having the formula

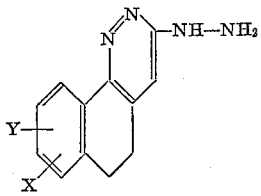

in which X and Y are alike or different but each is selected from the group comprised of H, F, Cl, Br, CF$_3$, OH, (lower)alkyl, (lower)alkoxy, NH$_2$ and NO$_2$ and a nontoxic pharmaceutically acceptable acid addition salt thereof.

Another preferred embodiment of the present invention is a compound having the formula

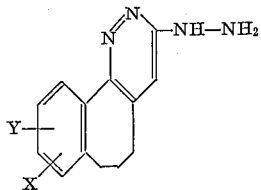

in which X and Y are as above, and a nontoxic pharmaceutically acceptable acid addition salt thereof.

A more preferred embodiment of the present invention is a compound having the formula

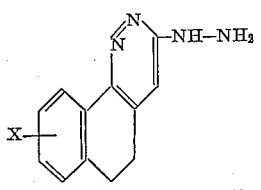

in which X is H, F, Cl, Br, CF$_3$, OH, (lower)alkyl, (lower)alkoxy, NO$_2$ and NH$_2$, and a nontoxic pharmaceutically acceptable acid addition salt thereof.

A more preferred embodiment of the present invention is the compound having the formula

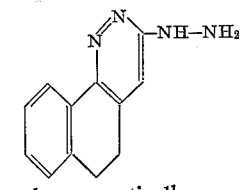

and a nontoxic pharmaceutically acceptable acid addition salt thereof.

A most preferred embodiment of the present invention is the compound having the formula

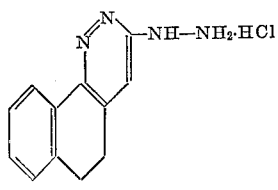

Pharmacological evaluation has indicated the compounds of the present invention possess hypotensive activity.

The blood pressure of unanesthetized rats and dogs was measured directly by means of a transducer attached to an intra-arterial cannula and in anesthetized dogs by a mercury manometer attached to a carotid cannula.

As an illustration, the compound 5,6-dihydro-3-hydrazinobenzo[h]cinnoline hydrochloride was tested by the above method. The oral LD$_{50}$ (lethal dose in 50%) in Albino Sprague-Dawley descendant rats was 165 mg./kg. This compound produced a 23% maximum decrease in mean blood pressure in unanethetized rats at an MED (Minimum Effective Dose) of 1.0 mg./kg. orally. Hypotension presisted for at least six hours but not less than 24 hours. Intraduodenal administration in anesthetized dogs produced at least a 15% decrease in means arterial pressure for three hours at a MED of 0.5 mg./kg. The compound was orally active in unanethetized dogs at a MED of 1.0 mg./kg. and intravenously at a MED of 0.25 mg./kg. The mean arterial pressure was decreased a maximum of 16% at 90 minutes following an oral dose of 1 mg./kg. and returned to within 5% of the control level at four hours. It had no effect on the responses to automonic agents. This compound therefore, has both oral as well as intravenous hypotensive activity in rats and dogs at low dosage.

As another illustration, the compound 3-hydrazinobenzocyclohepta[5,6-c]pyridazine hydrochloride was also tested.

This compound produced a 13% decrease in mean arterial pressure in unanesthetized rats at a minimum dose of 1.0 mg./kg. orally for at least one hour but less than three hours. The oral toxicity in the rat is greater than 150 mg./kg. Intraduodenal administration in anesthetized dogs produced a 30% decrease in mean arterial blood pressure for a period of two hours at a dosage of 5.0 mg./kg. An oral dose of 5.0 mg./kg. in unanesthetized dogs decreased mean arterial pressure to a maximum of 25% at 90 minutes with a gradual return to within 5% of control blood pressure at five hours.

This compound, therefore, has oral hypotensive activity in both rats and dogs.

In the treatment of hypertension in animals including man, the compounds of the present invention are administered orally and parenterally, in accordance with conventional procedures for the administration of hypotensive agents in an amount of from about 0.1 mg./kg./dose to 5 mg./kg./dose depending upon the route of administration and the particular compound of the invention. The preferred dosage for the compounds of the invention is in the range of about 0.2 to 2.0 mg./kg./dose three to four times a day.

In particular, the oral dose in man of the compound 5,6-dihydro-3-hydrazinobenzo[h]cinnoline hydrochloride, is in the range of 5 mg. to 50 mg. three to four times a day, and most preferably in the range of 5 to 25 mg. three to four times a day.

Preparation of the starting material 1-tetralone-2-acetic acids and benzosuber-1-one-2-acetic acids.

The nuclear substituted and unsubstituted 1-tetralone-2-acetic acids and benzosuber-1-one-2-acetic acids necessary for the preparation of the compounds of the present invention can be prepared by one of the methods referred to below:

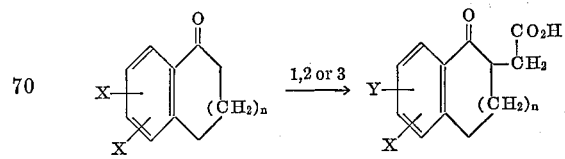

$n$, X and Y are as defined previously.

(1) M. Stiles, J. Amer. Chem. Soc., 81, 2598 (1959);

H. L. Finkbeiner and M. Stiles, J. Amer. Chem. Soc., 85, 616 (1963).

(2) J. Szmuszkovicz, Adv. in Org. Chem., 4, 1 (1963).

(3) M. S. Newman, W. C. Sagar, and C. C. Cochrane, J. Org. Chem., 23, 1832 (1958).

(4) Other Useful Methods:
  (A) Successive treatment of the 1-tetralone or 1-benzosuberone by/with:
    (1) α-Bromination,
    (2) Diethylmalonate, then
    (3) Hydrolysis to produce the keto-acid.
  (B) Successive treatment of the 1-tetralone or 1-benzosuberone by/with:
    (1) Diethylcarbonate,
    (2) Alkyl halogenoacetate, then
    (3) Hydrolysis to produce the keto-acid.

The nuclear substituted or unsubstituted 1-tetralones and 1-benzosuberones and the methods for their preparation are known to those knowledgeable in the art or are readily available in the chemical literature.

The following examples will serve to illustrate but not to limit the present invention

DESCRIPTION OF THE PREFERRED EMBODIMENTS

Example 1

(A) 2,3,4,4a,5,6-HEXAHYDRO-3-OXOBENZO[h]CINNOLINE

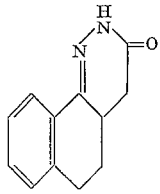

A solution of 2.04 g. (0.01 mole) 1-tetralone-2-acetic acid [W. H. Puterbaugh and R. L. Readshaw, J. Amer. Chem. Soc., 82, 3635 (1960)] and 0.6 g. (0.012 mole) hydrazine hydrate in 10 ml. 95% ethanol was heated at reflux for 2.5 hours. After cooling, the resultant precipitate was filtered and washed with ice-cold 95% ethanol. There was obtained 1.87 g. (93.5%) of crude material. Recrystallization from acetonitrile afforded the analytical sample, M.P. 199–200°.

Calculated for $C_{12}H_{12}N_2O$: C, 71.98%; H, 6.04%; N, 13.99%.

Found: C, 72.27%; H, 6.15%; N, 14.01%.

(B) 2,3,5,6-TETRAHYDRO-3-OXOBENZO[h]CINNOLINE

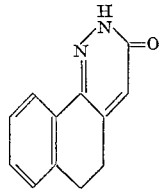

A mixture of 26 g. (0.13 mole) of 2,3,4,4a,5,6-hexahydro-3-oxobenzo[h]cinnoline in 195 ml. glacial acetic acid was heated at 60° with stirring until solution occurred. While heating was continued, 20.8 g. (0.13 mole) bromine was added carefully with vigorous stirring. Heating was maintained at 70° for 2 hours. Approximately 25 minutes after the addition of bromine, a precipitate was formed accompanied by a vigorous and copious evolution of hydrogen bromide gas. After cooling, the reaction mixture was poured into 400 ml. ice-water. The solid was filtered, washed thoroughly with cold water and once with cold ethanol, and finally dried. In this manner there was obtained 25.6 g. (99.6%) of crude product. Recrystallization from ethanol afforded the analytical sample, M.P. 257–261°.

Calculated for $C_{12}H_{10}N_2O$: C, 72.71%; H, 5.09%; N, 14.13%.

Found: C, 72.87%; H, 5.04%; N, 13.93%.

(C) 5,6-DIHYDRO-3-CHLOROBENZO[h]CINNOLINE

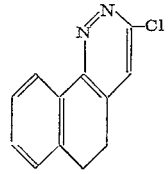

A suspension of 24.2 g. (0.12 mole) of 2,3,5,6-tetrahydro-3-oxobenzo[h]cinnoline in 200 ml. phosphorus oxychloride was heated at 100° for one hour. Solution occurred on heating. Excess phosphorus oxychloride was evaporated under reduced pressure and ice was added to the residue. After basification with 5 N sodium hydroxide and thorough extraction with chloroform, the extracts were first washed with water, dilute aqueous sodium hydroxide and brine, then dried over sodium sulfate, filtered and finally evaporated to dryness. The residue was dissolved in chloroform and stirred with charcoal for one hour. After filtration through super cel, and evaporation to near dryness, cold Skellysolve B was added and the resultant yellow precipitate was filtered and washed with more Skellysolve B. There was obtained after drying 21.5 g. (81%) of product, M.P. 151–154°.

Calculated for $C_{12}H_9N_2Cl$: C, 66.52%; H, 4.18%; N, 12.93%; Cl, 16.37%.

Found: C, 66.34%; H, 4.29%; N, 12.89%; Cl, 16.34%.

(D) 5,6-DIHYDRO-3-HYDRAZINOBENZO[h]CINNOLINE HYDROCHLORIDE

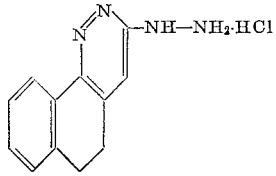

A solution of 43.3 g. (0.2 mole) 5,6-dihydro-3-chlorobenzo[h]cinnoline in 500 ml. hydrazine hydrate was heated slowly with stirring at 130° for 2.5 hours. After cooling slightly, crushed ice was added followed by 300 ml. ice water. Thorough cooling followed by filtration and washing with cold water afforded a yellowish solid material, which was added to 400 ml. of 15% aqueous hydrochloric acid and warmed very gently until solution occurred. More acid (concentrated) was added if the solution was basic. The solution was then allowed to cool to room temperature followed by thorough cooling in an ice bath. The crystallized product was collected and washed with 200 ml. ice water and once with 100 ml. of isopropyl alcohol. After drying, the crude product was recrystallized from a solution of 410 ml. isopropyl alcohol, 120 ml. water and 10 ml. 5% aqueous hydrochloric acid. There was obtained in this manner, 42.9 g. (86.5%) of product, M.P. 196° (decomposition).

Calculated for $C_{12}H_{12}N_4 \cdot HCl$: C, 57.95%; H, 5.27%; N, 22.53%; Cl, 14.26%.

Found: C, 57.68%, H, 5.30%; N, 22.70%; Cl, 14.18%.

Example 2

(A) 2,3,4,4a-TETRAHYDRO-3-OXOBENZO-CYCLOHEPTA[5,6-c]PYRIDAZINE

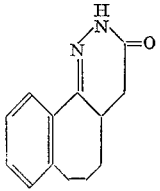

A solution of 21.8 g. (0.10 mole) benzosuber-1-one-2-acetic acid [W. J. Horton, H. W. Johnson and J. L. Zollinger, J. Amer. Chem. Soc., 76, 4587 (1954)] and 6.0 g. (0.12 mole) hydrazine hydrate in 100 ml. absolute alcohol was refluxed for 2.0 hours. After cooling, filtering and washing with cold ethanol the material was dried. There was obtained 20.1 g. (94%) of product. Recrystallization from ethanol afforded the analytical sample, M.P. 186.5–187°.

Calculated for $C_{13}H_{14}N_2O$: C, 72.87%; H, 6.59%; N, 13.08%.

Found: C, 72.72%; H, 6.48%; N, 13.20%.

(B) 2,3-DIHYDRO-3-OXOBENZOCYCLOHEPTA [5,6-c]PYRIDAZINE

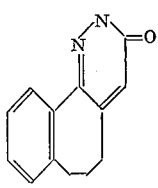

A 250 ml. flame dried three-neck round bottom flask equipped with a stirrer, condenser and pressure compensated dropping funnel was charged with 24.6 g. (0.115 mole) 2,3,4,4a-tetrahydro-3 - oxobenzocyclohepta[5,6-c] pyridazine in 170 ml. glacial acetic acid and placed under an atmosphere of nitrogen. The mixture was warmed to 75° until solution was complete, after which time there was added 18.4 g. (0.115 mole) bromine dropwise over a 30 minute period. The temperature was maintained at 75° for 1.5 hours afterwards. After cooling, the reaction mixture was poured unto ice, triturated and filtered. The collected solid was washed well with water. After drying, there was obtained 23.9 g. (94%) of crude material. Recrystallization from acetonitrile afforded the analytical sample, M.P. 235–239°.

Calculated for $C_{13}H_{12}N_2O$: C, 73.56%; H, 5.70%; N, 13.20%.

Found: C, 73.32%; H, 5.86%; N, 13.41%.

(C) 3-CHLOROBENZOCYCLOHEPTA [5,6-c]PYRIDAZINE

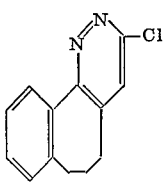

A solution of 5.0 g. (0.0236 mole) of 2,3-dihydro-3-oxobenzocyclohepta[5,6-c]pyridazine in 50 ml. phosphorus oxychloride was heated at reflux for 30 minutes. After removal of the excess phosphorus oxychloride the residue was poured into ice water with good stirring. After rendering the aqueous phase basic to pH 8–9 with concentrated ammonium hydroxide the separated solids were extracted with methylene chloride. The combined extracts were washed with water and brine and dried over sodium sulfate. Filtration and removal of the solvent afforded a solid residue which when recrystallized from ethyl acetate with charcoal afforded 4.41 g. (81.2%) of product. Further recrystallization afforded the analytical sample, M.P. 156.5–158°.

Calculated for $C_{13}H_{11}N_2Cl$: C, 67.67% H, 4.81%; N, 12.14%; Cl, 15.37%.

Found: C, 67.72%; H, 4.80%; N, 12.01%; Cl, 15.65%.

(D) 3-HYDRAZINOBENZOCYCLOHEPTA[5,6-c] PYRIDAZINE HYDROCHLORIDE

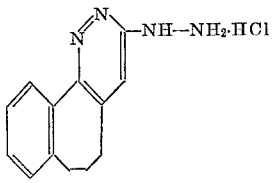

A mixture of 2.95 g. (0.012 mole) of 3-chlorobenzocyclohepta[5,6-c]pyridazine in 50 ml. hydrazine hydrate was heated slowly with stirring to 130° and continued heating at 130° for 3 hours. After cooling, water was added and the separated solid was filtered and washed with cold water. After drying there was obtained 3.25 g. of free hydrazine-base which was recrystallized from ethyl acetate-Skellysolve B. The free hydrazine-base was dissolved in ether-ethanol solution to which was then added dropwise, with stirring, a saturated solution of hydrochloric acid in ether. The separated solid was collected, washed with ether and dried. In this manner there was obtained 2.16 g. (68.5%) of product. Recrystallization from isopropyl alcohol afforded the analytical sample, M.P. 242–244°.

Calculated for $C_{13}H_{14}N_4 \cdot HCl$: C, 59.43% H, 5.75% N, 21.33%; Cl, 13.49%.

Found: C, 59.59%; H, 5.98%; N, 21.19%; Cl, 13.67%.

Example 3

1-TETRALONE-2-ACETIC ACID

A flame-dried 3 liter three neck round bottom flask equipped with a stirrer and two Dry-Ice condensers was placed under an atmosphere of nitrogen and charged with 1 liter of anhydrous ammonia. Approximately 500 mg. of ferric nitrate nonahydrate was then added to give a rusty colored mixture. A total of 8.3 g. (1.2 mole) cleaned (washed in toluene) lithium wire was then added. [A small amount of lithium wire was added and stirred until the blue color which developed turned to a gray precipitate. Once the reaction has started, the lithium wire was added at such a rate that the ammonia refluxed rapidly and the blue color was continually discharged. If the reaction did not continue on addition of more lithium, more ferric salt was added. If the lithium was added slowly, the gray precipitate became very dark and conversely the faster the addition, the lighter the precipitate. This effect seemed to have no relation to yield.] After the addition was complete and no blue color was apparent, one of the Dry Ice condensers was removed and 110 g. (0.75 mole) α-tetralone was added rapidly followed by 250 ml. of dry ether (dried over sodium). [This procedure gave a better yield than if a solution of α-tetralone in ether was added.] The other dry-ice condenser and the dropping funnel were replaced by two Friedrich condensers (no water was used), after which the ammonia and some ether was evaporated to a volume of 200 ml. with the aid of a steam bath. An additional 500 ml. of dry ether was then added and heated at reflux for 30 minutes to remove excess ammonia. After cooling 52 g. (0.37 mole) bromoacetic acid in 250 ml. dry ether was added slowly with vigorous stirring. [The white solid which formed at the tip of the dropping funnel was ammonium bromacetate. Occasionally the flow of solution was stopped by large amounts of this material. To continue the flow, the white solid was merely scraped into the reaction mixture.] The resulting reaction mixture was refluxed for 20 hours. While cooling in an ice bath, water was added slowly until the solids dissolved. The layers were separated and the ethereal layer was washed with 2×250 ml. portions of water. The combined aqueous extracts were washed with 2×250 ml. ether, cooled and acidified with concentrated hydrochloric acid. The separated acid was extracted with chloroform. The combined chloroform extracts were washed with brine, dried over sodium sulfate, filtered and evaporated to dryness. The semi-solid so obtained was recrystallized from ethyl acetate-Skellysolve B. This procedure afforded yields of 65–75% ketoacid Ia with M.P. 98–104°. The material can be used directly in the next step without further purification.

Example 4

2,3,4,4a,5,6-HEXAHYDRO-3-OXOBENZO[h] CINNOLINE (IIa)

A solution of 83.7 g. (0.41 mole) 1-tetralone-2-acetic acid and 24 ml. (0.46 mole) hydrazine hydrate in 500 ml. 95% ethyl alcohol was refluxed with stirring for three hours. [Product crystallizes and out.] Cooled and added an equal volume of water. Further cooling and filtration afforded a crystalline product which was washed with cold water and dried. This procedure afforded yields of 92–97% of cinnoline IIa with M.P. 198–204°. The material can be used in the next step without recrystallization.

Example 5

2,3,5,6-TETRAHYDRO-3-OXOBENZO[h] CINNOLINE

A mixture of 26 g. (0.13 mole) 2,3,4,4a,5,6 - hexahydro - 3 - oxobenzo[h]cinnoline in 195 ml. glacial acetic acid was heated with stirring at 60° until solution occurred. While still heating, 20.8 g. (0.13 mole) bromine was added dropwise with vigorous stirring. After addition was complete, stirring was continued with the temperature maintained at 65–70° for 2 hours. After approximately 25 minutes (the same in each experiment) a precipitate was formed, the bromine color was discharged, there was vigorous evolution of hydrogen bromide gas and the reaction was very exothermic. [Caution must be exercised. All of these changes take place very rapidly. The reaction seems to depend on temperature and if held at 60° no reaction takes place for some time, but if heated to 65–70° the reaction takes place very rapidly.] After cooling and pouring into 400 ml. of ice-water, the yellowish solid was filtered, washed with water and once with 50 ml. cold ethanol. Recrystallization from absolute ethanol afforded yields of 95–99% of material with M.P. 254–260°.

Example 6

5,6-DIHYDRO-3-CHLOROBENZO[h]CINNOLINE

A suspension of 24.2 g. (0.12 mole) 2,3,5,6 - tetrahydro - 3 - oxobenzo[h]cinnoline in 200 ml. redistilled phosphorus oxychloride was heated with stirring at 100° for one hour. [Solution eventually takes place.] Excess phosphorus oxychloride was removed under reduced pressure, and while cooling in an ice bath, crushed ice was added to the pot residue. [Caution: Reaction of residue with water can be violent. A different procedure might be tried here where the pot residue still containing some phosphorus oxychloride might be poured onto ice.] More water was added and the aqueous phase made basic with 5 N sodium hydroxide. A thick gum was formed which solidified. Thorough extraction with large amounts of chloroform followed. The combined extracts were washed with water, 5% aqueous sodium hydroxide, and brine, dried over $Na_2SO_4$, filtered and stirred with charcoal for one hour. After filtration through super cel (filtering aid), most of the chloroform was removed and Skellysolve B was added. Cooling afforded a crystalline product which was filtered and washed with cold Skellysolve B. Recrystallization from ethyl acetate and a small amount of Skellysolve B (petroleum solvent, essentially n-hexane, boiling point 60–68° C.) afforded yields of 70–90%, M.P. 151–154°.

Example 7

5,6-DIHYDRO-3-HYDRAZINOBENZO[h] CINNOLINE HYDROCHLORIDE

A mixture of 43.3 g. (0.2 mole) 5,6 - dihydro - 3-chlorobenzo[h]cinnoline and 400 ml. hydrazine hydrate was heated with stirring to 130° and continued heating at 130° for 2.5 hours. Cooled until yellowish material just started to oil out and added large amounts of crushed ice. [If the reaction solution was cooled slowly in an ice bath, the product tended to oil out. It was found that the addition of crushed ice along with cooling gave a solid much faster and made it easier to work with.] Added cold water, cooled thoroughly in ice bath, filtered and washed with 300 ml. cold water and sucked as dry as possible. [Product has some solubility in water, therefore aqueous portions were kept as cold as possible.] The excess hydrazine hydrate was very difficult to wash from the product. Therefore, the crude wet product was added to 400 ml. of 15% aqueous hydrochloric acid and warmed on a steam bath until solution occurred. If the solution was still basic due to the excess hydrazine, concentrated hydrochloric acid was added until the solution was acidic. [Not getting rid of all the hydrazine hydrate seems to have some advantages in that the large amount of hydrazine hydrochloride formed when taken up in 15% hydrochloric acid facilitates the precipitation of the slightly soluble hydrochloride salt of the product.] Do not boil or heat over long periods of time because of product decomposition. After cooling to room temperature, the crystalline hydrochloride salt was filtered and washed with 200 ml. ice-water and once with 100 ml. cold isopropyl alcohol. Dried over phosphorus pentoxide under high vacuum. Recrystallized from a solution made up of 120 ml. water, 410 ml. isopropyl alcohol and 10 ml. 5% aqueous hydrochloric acid. [Be sure not to boil or heat for prolonged periods.] After cooling, the product was filtered and washed with small amounts of cold water and cold isopropyl alcohol. Yields of 70–85% were obtained of material which had a decomposition point at 196°.

Example 8

5,6-DIHYDRO-3-HYDRAZINO-9-METHOXYBENZO[h] CINNOLINE HYDROCHLORIDE

Substitution in the procedure of Example 1 for the 1-tetralone - 2 - acetic acid used therein of 7 - methoxy-1 - tetralone - 2 - acetic acid produces 5,6 - dihydro - 3-hydrazino - 9 - methoxybenzo[h]cinnoline hydrochloride.

Example 9

5,6-DIHYDRO-3-HYDRAZINO-8-NITROBENZO[h] CINNOLINE HYDROCHLORIDE

Substitution in the procedure of Example 1 for the 1-tetralone - 2 - acetic acid used therein of 6 - nitro - 1-tetralone - 2 - acetic acid produces 5,6 - dihydro - 3-hydrazino-8-nitrobenzo[h]cinnoline hydrochloride.

Example 10

5,6-DIHYDRO-3-HYDRAZINO-9-METHYLBENZO[h] CINNOLINE HYDROCHLORIDE

Substitution in the procedure of Example 1 for the 1-tetralone - 2 - acetic acid used therein of 7 - methyl - 1-tetralone - 2 - acetic acid produces 5,6 - dihydro - 3-hydrazino-9-methylbenzo[h]cinnoline hydrochloride.

Example 11

5,6-DIHYDRO-3-HYDRAZINO-8-TRIFLUOROMETHYL-BENZO[h]CINNOLINE HYDROCHLORIDE

Substitution in the procedure of Example 1 for the 1-tetralone - 2 - acetic acid used therein of 6 - trifluoromethyl - 1 - tetralone - 2 - acetic acid produces 5,6- dihydro - 3 - hydrazino - 8 - trifluoromethylbenzo[h] cinnoline hydrochloride.

Example 12
5,6-DIHYDRO-3-HYDRAZINO-8-CHLOROBENZO[h] CINNOLINE HYDROCHLORIDE Substitution in the procedure of Example 1 for the 1-tetralone-2-acetic acid used therein of 6-chloro-1-tetralone-2-acetic acid produces 5,6-dihydro-3-hydrazino-8-chlorobenzo[h]cinnoline hydrochloride.

Example 13
5,6-DIHYDRO-3-HYDRAZINO-8,9-DIMETHYLBENZO[h] CINNOLINE HYDROCHLORIDE Substitution in the procedure of Example 1 for the 1-teralone-2-acetic acid used therein of 6,7-dimethyl-1-tetralone-2-acetic acid produces 5,6-dihydro-3-hydrazino-8,9-dimethylbenzo[h]cinnoline hydrochloride.

Example 14
5,6-DIHYDRO-3-HYDRAZINO-8-HYDROXY-9-METHOXY-BENZO[h]CINNOLINE HYDROCHLORIDE Substitution in the procedure of Example 1 for the 1-tetralone-2-acetic acid used therein of 6-hydroxy-7-methoxy-1-tetralone-2-acetic acid produces 5,6-dihydro-3-hydrazino-8-hydroxy-9-methoxybenzo[h]cinnoline hydrochloride.

Example 15
3-HYDRAZINO-9,10-DIMETHYLBENZOCYCLOHEPTA-[5,6-c]PYRIDAZINE HYDROCHLORIDE Substitution in the procedure of Example 2 for the benzosuber-1-one-2-acetic acid used therein of 7,8-dimethylbenzo-1-one-2-acetic acid produces 3-hydrazino-9,10-dimethylbenzocyclohepta[5,6-c]pyridazine hydrochloride.

Example 16
3-HYDRAZINO-9-BROMOBENZOCYCLOHEPTA[5,6-c] PYRIDAZINE HYDROCHLORIDE Substitution in the procedure of Example 2 for the benzosuber-1-one-2-acetic acid used therein of 7-bromo-benzosuber-1-one-2-acetic acid produces 3-hydrazino-9-bromobenzocyclohepta[5,6-c]pyridazine hydrochloride.

Example 17
3-HYDRAZINO-10-AMINOBENZOCYCLOHEPTA[5,6-c] PYRIDAZINE HYDROCHLORIDE Substitution in the procedure of Example 2 for the benzosuber-1-one-2-acetic acid used therein of 8-amino-1-tetralone-2-acetic acid produces 3-hydrazino-10-aminobenzocyclohepta[5,6-c]pyridazine hydrochloride.

Example 18
3-HYDRAZINO-9-FLUORO-10-METHOXY-BENZOCYCLOHEPTA[5,6-c]PYRIDAZINE HYDROCHLORIDE Substitution in the procedure of Example 2 for the benzosuber-1-one-2-acetic acid used theerin of 7-fluoro-8-methoxybenzosuber-1-one-2-acetic acid produces 3-hydrazino-9-fluoro-10-methoxy-benzocyclohepta[5,6-c]pyridazine hydrochloride.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:
1. A compound having the formula

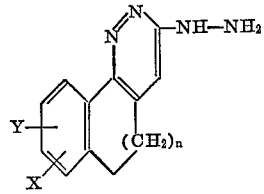

wherein X and Y are alike or different and each is selected from the group comprised of H, F, Cl, Br, CF$_3$, OH (lower)alkyl (lower)alkoxy NH$_2$ and NO$_2$; and
 n is the integer 1 or 2; or a nontoxic, pharmaceutically-acceptable addition salt thereof.

2. A compound of claim 1 having the formula

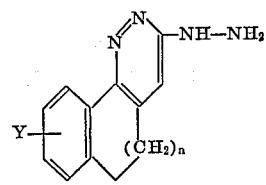

wherein Y is selected from the group comprised of H, F, Cl, Br, CF$_3$, OH, (lower)alkyl, (lower)alkoxy, NH$_2$ and NO$_2$; and
 n is the integer 1 or 2; or a nontoxic, pharmaceutically-acceptable acid addition salt thereof.

3. A compound of claim 1 having the formula

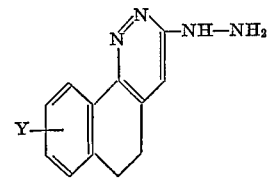

wherein Y is selected from the group comprised of H, F, Cl, Br, CF$_3$, OH, (lower)alkyl, (lower)alkoxy, NH$_2$ and NO$_2$; or a nontoxic, pharmaceutically-acceptable acid addition salt thereof.

4. The compound of claim 1 having the formula

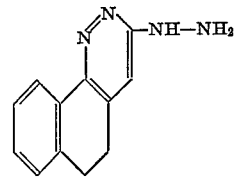

or a nontoxic, pharmaceutically-acceptable acid addition salt thereof.

5. A compound of claim 1 having the formula

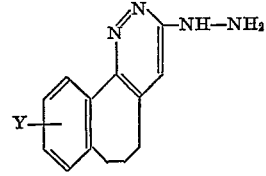

in which Y is selected from the group comprised of H, F, Cl, Br, CF$_3$, OH, (lower)alkyl, (lower)alkoxy, NH$_2$ and NO$_2$, or a nontoxic, pharmaceutically-acceptable acid addition salt thereof.

6. The compound of claim 1 having the formula
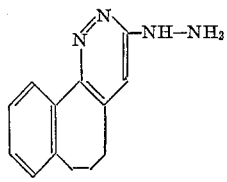
or a nontoxic, pharmaceutically-acceptable acid addition salt thereof.
7. The hydrochloride salt of the compound of claim 4.
8. The hydrochloride salt of the compound of claim 6.
References Cited
UNITED STATES PATENTS
| 2,484,029 | 6/1949 | Druey | 260—250 |
| 2,786,839 | 3/1957 | Zerweck et al. | 260—250 |
| 2,838,513 | 6/1958 | Druey | 260—250 |
NICHOLAS S. RIZZO, Primary Examiner
U.S. Cl. X.R.
424—250